(12) United States Patent
Nair (10) Patent No.: US 10,402,399 B2
(45) Date of Patent: Sep. 3, 2019

(54) COMPUTER IMPLEMENTED SYSTEM AND METHOD FOR DYNAMICALLY OPTIMIZING BUSINESS PROCESSES

(71) Applicant: NUWAFIN HOLDINGS LTD, Dubai (AE)

(72) Inventor: Nandakumar Krishnan Nair, Trivandram (IN)

(73) Assignee: NUWAFIN HOLDINGS LTD, Al-Qusais, Dubai (*) Notice: Subject to any disclaimer, the term of this patent is extended or adjusted under 35 U.S.C. 154(b) by 645 days.

(21) Appl. No.: 14/846,694

(22) Filed: Sep. 4, 2015

(65) Prior Publication Data

US 2017/0068915 A1    Mar. 9, 2017

(51) Int. Cl.
| | |
|---|---|
| G06F 16/00 | (2019.01) |
| G06F 16/245 | (2019.01) |
| G06Q 10/06 | (2012.01) |
| G06F 16/248 | (2019.01) |
| H04L 29/06 | (2006.01) |
| G06F 16/28 | (2019.01) |
| H04L 12/911 | (2013.01) |
| G06Q 10/10 | (2012.01) |
| H04W 28/16 | (2009.01) |
| H04L 12/24 | (2006.01) |

(52) U.S. Cl.
CPC .......... *G06F 16/245* (2019.01); *G06F 16/248* (2019.01); *G06F 16/285* (2019.01); *G06Q 10/067* (2013.01); *G06Q 10/0631* (2013.01); *G06Q 10/0633* (2013.01); *G06Q 10/10* (2013.01); *H04L 47/70* (2013.01); *H04L 63/10* (2013.01); *H04L 63/20* (2013.01); *H04L 41/0803* (2013.01); *H04W 28/16* (2013.01)

(58) Field of Classification Search
None
See application file for complete search history.

(56) References Cited

U.S. PATENT DOCUMENTS

| | | | |
|---|---|---|---|
| 2003/0172145 A1* | 9/2003 | Nguyen | G06Q 10/10 709/223 |
| 2004/0117759 A1* | 6/2004 | Rippert, Jr. | G06F 8/20 717/100 |
| 2008/0008116 A1* | 1/2008 | Buga | H04L 41/046 370/328 |

(Continued)

*Primary Examiner* — Gurkanwaljit Singh
(74) *Attorney, Agent, or Firm* — Barry Choobin; Patent 360 LLC (57) ABSTRACT

A computer implemented system for dynamically optimizing enterprise applications, have been disclosed. The system includes a capturing module configured to capture at least the user requirements including non functional requirements, and definitions corresponding to an enterprise application to be deployed. The system further includes an identifier for identifying at least the processes and services corresponding to each of the user requirements. The identified processes are subsequently customized and, a plurality of customizable computer accessible objects are generated. A model, comprising the customizable computer accessible objects is created. The model is a representation of the computer infrastructure required for successful deployment of the application. The computer accessible objects are dynamically and iteratively optimized depending upon their performance.

12 Claims, 5 Drawing Sheets

(56) References Cited

U.S. PATENT DOCUMENTS

| | | | |
|---|---|---|---|
| 2012/0069131 A1* | 3/2012 | Abelow | G06Q 10/067 348/14.01 |
| 2016/0034305 A1* | 2/2016 | Shear | G06F 16/245 707/722 |
| 2017/0068915 A1* | 3/2017 | Nair | G06Q 10/067 |

* cited by examiner

COMPUTER IMPLEMENTED SYSTEM AND METHOD FOR DYNAMICALLY OPTIMIZING BUSINESS PROCESSES

BACKGROUND

Technical Field

The embodiments herein relates to computer implemented systems/methods that optimize business services/processes. Particularly, the embodiments herein relates to systems/methods that optimize the business services/processes depending upon the corresponding deployment architecture.

Description of the Related Art

Service Oriented Architecture (SOA) is a set of principles and methodologies used for designing and developing software applications in the form of interoperable services. These services are well-defined business functionalities that are built as software components that can be reused for different purposes. The major aim of the business functionalities is to support and streamline the process of business. The functions are also expected to, inter-alia optimize the manner in which business would be conducted.

Typically, business functionalities are implemented through enterprise applications which are typically created based on a plurality of business rules which comprises a framework corresponding to the manner in which the enterprise applications are required to be developed and implemented. Typically, an enterprise application/enterprise solution makes use of a plurality of platform services. The platform services are typically a set of libraries (software) and the corresponding hardware components such as the servers, networking infrastructure, memory modules and other services which are required to host the enterprise application.

Developing an optimized business application is no easy task given the fact that the information corresponding to the impact of an enterprise application on a business process is typically sparse. Moreover, for an efficient and effective enterprise application to be developed, the underlying business requirements should be effectively captured and recorded (from a functional point of view as well as non-functional point of view).

There was felt a need for a computer implemented system and method which would enable a user to articulate the business requirements corresponding to an enterprise application. Further, there was also felt a need for a system and method that support the collaborative development, deployment, execution, and maintenance of enterprise applications. There was also felt a need for a system that would enable users, even those users who are not familiar with the technicalities of software application development, to create enterprise applications.

The above mentioned shortcomings, disadvantages and problems are addressed herein and which will be understood by reading and studying the following specification.

OBJECTIVES OF THE EMBODIMENTS

An object of the embodiments herein is to provide a system and method that provides for development, seamless integration and execution of enterprise applications.

Yet another object of the embodiments herein is to provide a system and method that enables seamless integration of platform services and business rules.

One more object of the embodiments herein is to provide a system and method that enables creation of enterprise application from a functional point of view as well as a non-functional point of view.

Still a further object of the embodiments herein is to provide a system and method that make use of Service Oriented Architecture (SOA) to develop enterprise applications.

Yet another object of the embodiments herein is to provide a system and method that optimizes the configuration of business services, in order to improve reliability and performance.

One more object of the embodiments herein is to provide a system and method that enables dynamic optimization of the enterprise applications, by providing for selective reconfiguration of the underlying business services.

Yet another object of the embodiments herein is to provide a system and method that analyzes the (deployment) environment of the enterprise application, and suggests appropriate modifications to the deployment environment, in order to improve the performance and reliability of enterprise applications.

These and other objects and advantages of the embodiments herein will become readily apparent from the following detailed description taken in conjunction with the accompanying drawings.

SUMMARY

The embodiments herein, in accordance with a first embodiment discloses a computer implemented system for dynamically optimizing enterprise applications. The system, in accordance with the embodiments herein comprises a capturing module configured to capture at least the user requirements including the non functional requirements, and the definitions corresponding to an enterprise application to be deployed.

The system further includes an application authoring interface, which includes an identifier configured to identify at least the processes and services corresponding to each of the user requirements. The application authoring interface further includes a customizing module configured to iteratively customize the identified processes/services in accordance with at least the user requirements and generate a plurality of customizable computer accessible objects, wherein the objects in combination form the enterprise application to be deployed.

The system, in accordance with the embodiments herein includes a model creator configured to create a deployment model. The deployment model created by the model creator is a representation of the computer infrastructure required for successful deployment of the application.

The system, in accordance with the embodiments herein further includes an optimizer having access to the computer accessible objects and the deployment model. The optimizer selectively optimizes the computer accessible objects in line with the deployment model. The optimizer tracks and measures the performance of the optimized computer accessible objects. The optimizer selectively modifies and re-optimizes the computer accessible objects based on the performance thereof.

In accordance with the first embodiment, the system further comprises a computer accessible knowledge base cooperating with the optimizer, the knowledge base configured to store the information corresponding to the performance of the computer accessible objects.

In accordance with the first embodiment, the capturing module is further configured to organize the captured user requirements in accordance with a predetermined hierarchy.

In accordance with the first embodiment, the customizing module is configured to dynamically customize the generated computer accessible objects in line with the customization of the identified process/services.

The embodiments herein, in accordance with a second embodiment discloses a computer implemented method for dynamically optimizing enterprise applications. The method, in accordance with the embodiments herein comprises the following computer implemented steps: capturing at least the user requirements including non functional requirements, and definitions corresponding to an enterprise application to be deployed; identifying at least the processes and services corresponding to each of the user requirements; iteratively customizing the identified processes/services in accordance with at least the user requirements and generating a plurality of customizable computer accessible objects, the objects in combination forming the application to be deployed; creating a deployment model, the deployment model being a representation of the computer infrastructure required for successful deployment of the application; selectively optimizing the computer accessible objects in line with the deployment model; and tracking and measuring the performance of the optimized computer accessible objects, and selectively modifying and re-optimizing the computer accessible objects based on the performance.

In accordance with the second embodiment, the step of capturing at least the user requirements further includes the step of organizing the captured user requirements in accordance with a predetermined hierarchy.

In accordance with the second embodiment, the step of iteratively customizing the identified processes/services further includes the step of dynamically customizing the generated computer accessible objects in line with the customization of the identified process/services.

In accordance with the second embodiment, the method further includes the step of selectively deploying the generated model in a computer enabled environment, in accordance with the metadata corresponding to the computer enabled environment.

In accordance with a third embodiment, the embodiments herein discloses a non transitory computer readable medium having computer readable instructions stored thereupon. The computer readable instructions, when executed by a processor, cause a computer enabled device to: capture at least the user requirements including non functional requirements, and definitions corresponding to an enterprise application to be deployed; identify at least the processes and services corresponding to each of the user requirements; iteratively customize the identified processes/services in accordance with at least the user requirements and generate a plurality of customizable computer accessible objects, the objects in combination forming the application to be deployed; create a deployment model, the deployment model being a representation of the computer infrastructure required for successful deployment of the application; selectively optimize the computer accessible objects in line with the deployment model; and track and measure the performance of the optimized computer accessible objects, and selectively modify and re-optimize the computer accessible objects based on the performance.

In accordance with one of the embodiments herein, the computer readable instructions, when executed by a processor are further configured to cause a computer enabled device to: organize the captured user requirements in accordance with a predetermined hierarchy; dynamically customize the generated computer accessible objects in line with the customization of the identified process/services; and selectively deploy the generated model in a computer enabled environment, in accordance with the metadata corresponding to the computer enabled environment.

These and other aspects of the embodiments herein will be better appreciated and understood when considered in conjunction with the following description and the accompanying drawings. It should be understood, however, that the following descriptions, while indicating the preferred embodiments and numerous specific details thereof; are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Service-Oriented Architecture (SOA) is a set of principles and methodologies utilized for designing and developing software in the form of interoperable services (also referred to as SAS-Software as Service). These services are well-defined business functionalities that are built as software components that can be reused for various purposes. A business service contract expresses meta-level information about a service. The fundamental part of a service contract consists of the service description that expresses its technical interface, essentially establishing an Application Program Interface (API) into the functionality offered by the service. The system envisaged by the embodiments herein is capable of generating enterprise applications, based on the definition of its business requirements from a functional and non-functional point of view. The system envisaged by the embodiments herein supports the collaborative development, deployment, execution and maintenance of enterprise applications (on the cloud or otherwise). The system envisaged by the embodiments herein allows business users (non-technical users) to build an enterprise application by wiring platform services with business rules (rule-based wiring) to build the business services, business processes and user interface (chosen based on a pre-defined template recommended by the system) required for the enterprise application. The system envisaged by the embodiments herein accordingly exposes business services which have been architected using the SOA paradigm.

Figure 1:
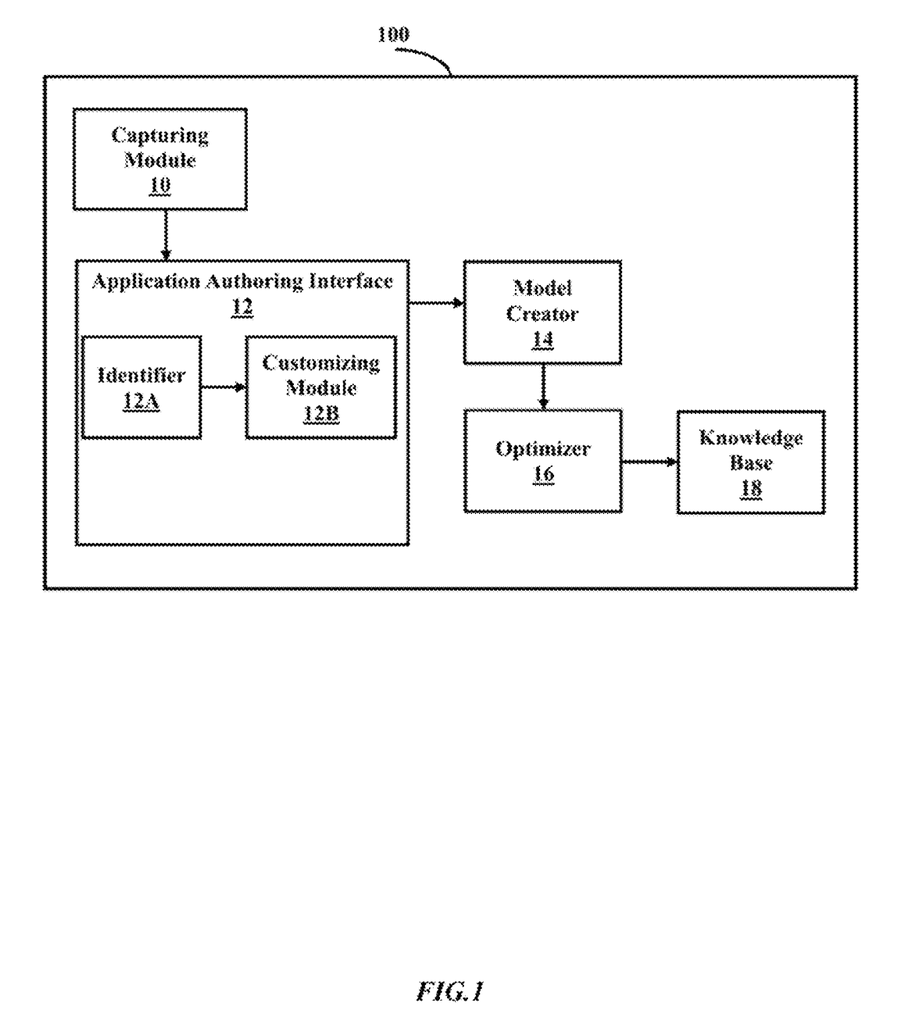
FIG. 1 Illustrates a system level block diagram of a computer implemented system for dynamically optimizing business processes, according to one embodiment herein.

FIG. 1 describes the first embodiment of the embodiments herein which includes a computer implemented system 100 for dynamically optimizing enterprise applications. The system 100, in accordance with the embodiments herein comprises a capturing module 10 configured to capture at least the user requirements including non functional requirements, and definitions corresponding to an enterprise application to be deployed. The user requirements can also be in the form of user stories (the description of user stories, which is well known in the art, has been skipped for the sake of brevity). Further, the capturing module 10 also captures the application requirements, and functionalities to be incorporated into the enterprise application, via high level text inputs from the purported users of the enterprise application. Further, the capturing module 10 also capture the non-functional requirements corresponding to the enterprise application, including but not restricted to, performance factors, reliability factors, usability factors, and maintainability factors. The capturing module 10 is further configured to organize the captured user requirements in accordance with a predetermined hierarchy.

Figure 3:
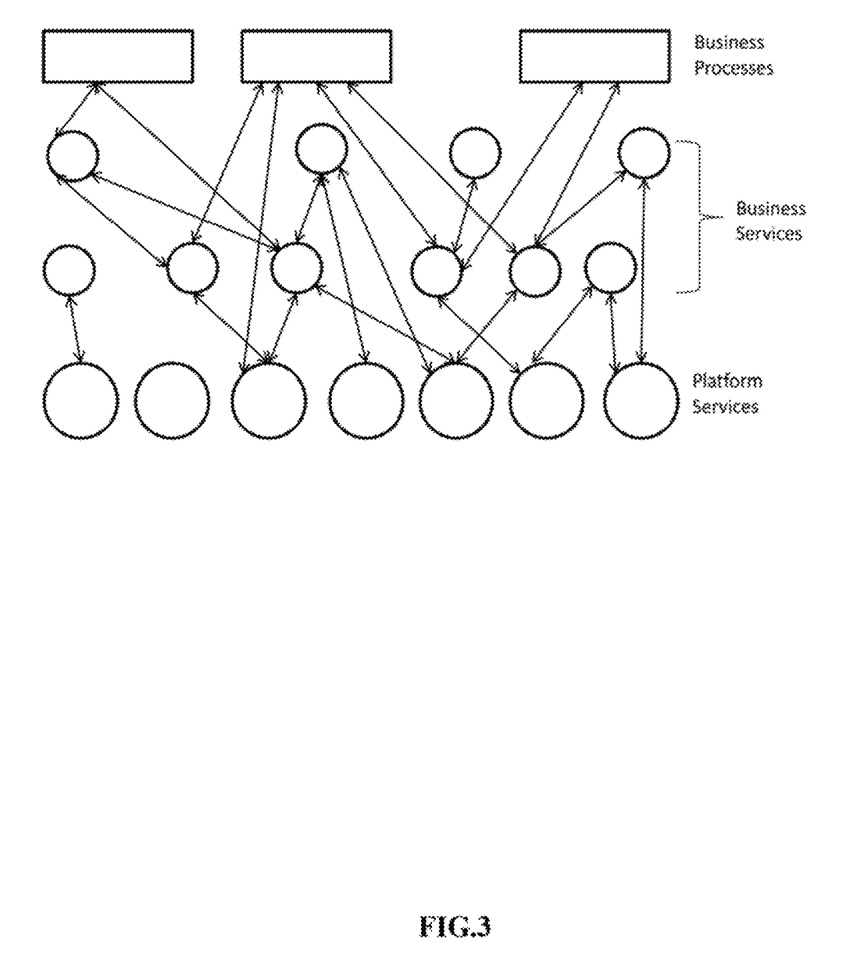
FIG. 3 illustrates the business artifacts, in accordance with the embodiments herein, according to one embodiment herein.

The system 100, in accordance with the embodiments herein comprises an application authoring interface 12. The application authoring interface 12 is typically accessed by a user to model the business solutions and render them suitable for deployment. The output of the application authoring Interface 12 is a collection of computer accessible artifacts (business solution artifacts; as illustrated in FIG. 3), which collectively represent the Business Solution to be built and deployed preferably atop the deployment environment.

In accordance with the embodiments herein, the computer accessible artifacts generated by the application authoring interface 12 include but are not restricted to platform services, which include basic technical services such as File Access, Storage/Retrieval of data etc. These technical services form the fundamental blocks of any given business solution. Further, the computer accessible artifacts include business services which are business-specific, for example billing. These services are utilized to model the various services that need to be fulfilled by a solution to meet the prerequisites. Further, the computer accessible artifacts include business processes. For example, the 'create customer' business process would typically include various other steps such as customer data capture, account set-up, manual data verification and the like. Further, the computer accessible artifacts include business rules which represent the Business processes as a collection of business services that are 'wired' together using business rules.

The application authoring interface 12 further comprises an identifier 12A configured to identify at least the processes and services corresponding to each of the user requirements (corresponding to the development of the enterprise application). The application authoring interface 12 further includes a customizing module 12B configured to iteratively customize the identified processes/services in accordance with at least the user requirements and generate a plurality of customizable computer accessible objects. The objects (for example, JAVA based objects), when combined together, form the enterprise application to be deployed. The customizing module 12B is configured to dynamically customize the generated computer accessible objects in line with the customization of the identified process/services.

In accordance with the embodiments herein, the system 100 further includes a model creator 14 configured to create a deployment model. The deployment model is a representation of the computer infrastructure required for successful deployment of the enterprise application. In accordance with the embodiments herein, the deployment model incorporates the necessary metadata corresponding to the environment where the application is to be deployed. The deployment model comprises information about the hardware capabilities of each of the nodes across which the application is to be deployed (including but not restricted to CPU capabilities, required memory space and hard disk space), the number of nodes in a rack cluster and the corresponding network topology. Additional information corresponding to the usage of the deployment environment, including maximum number of supported transactions per node, maximum data traffic between nodes in a cluster as well as across a plurality clusters are also included in the deployment model.

In accordance with the embodiments herein, the model creator 14 simulates the hardware capabilities of the deployment environment, including but not restricted to CPU & Memory capabilities, and data storage requirements. Typically, each business service is composed of basic platform services. The processing requirement for basic platform services is typically well known. From this information, the model creator 14 will be able to estimate the processing requirement for each business service that has been composed by the user. Further, for service operations where reliability is not key (short term data within a transactional boundary), the model creator 14 designates RAID 0 or 1 storage. For services requiring greater reliability (transactional data to be committed), model creator 14 designates RAID 5 or 6.

The model creator 14, depending on the location of two different services, determines the mode of communication. Typically, for services within the same node, direct method invocations are hardcoded during compilation. For services across different nodes, RPC calls are typically hardcoded during compilations. Depending on the network speed, business services that are closely integrated and will communicate frequently are places together within the same node, by the model creator 14.

In accordance with the embodiments herein, the system 100 further includes an optimizer 16 having access to the computer accessible objects and the deployment model (created by the model creator 14). The optimizer 16 selectively optimizes the computer accessible objects in line with the deployment model. The optimizer 16 further tracks and measures the performance of the optimized computer accessible objects, and selectively modifies and re-optimizes the computer accessible objects based on the performance. The optimizer 16 receives the deployment model (constructed using the model creator 14), and the computer accessible objects (business solution artifacts), as inputs and thereafter generates computer executable code for the subject business solution that is optimized for high-performance and reliability for the deployment environment represented by the Deployment Model.

The various performance & reliability enhancement steps undertaken by the optimizer 16 include but are not restricted to:

CPU & Memory—Each business service is composed of basic platform services. The processing requirement for basic platform services is known. From this, the optimizer 16 estimates the processing requirement for each business service that has been composed by the user. Hence, the optimizer 16 will be able to allocate business services to the nodes in the deployment environment in an optimal manner;

Data storage—For service operations where reliability is not key (short term data within a transactional boundary), RAID 0 or 1 storage can be used. For services requiring greater reliability (transactional data to be committed), RAID 5 or 6 can be used.

Further, depending on the location of two different services, the optimizer 16 decides whether to hardcode the mode of communication between the services, during compilation (i.e.) for services within the same node, direct method invocations can be hardcoded during compilation; for services across different nodes, remote procedure calls (RPC) can be hardcoded during compilations.

Figure 4:
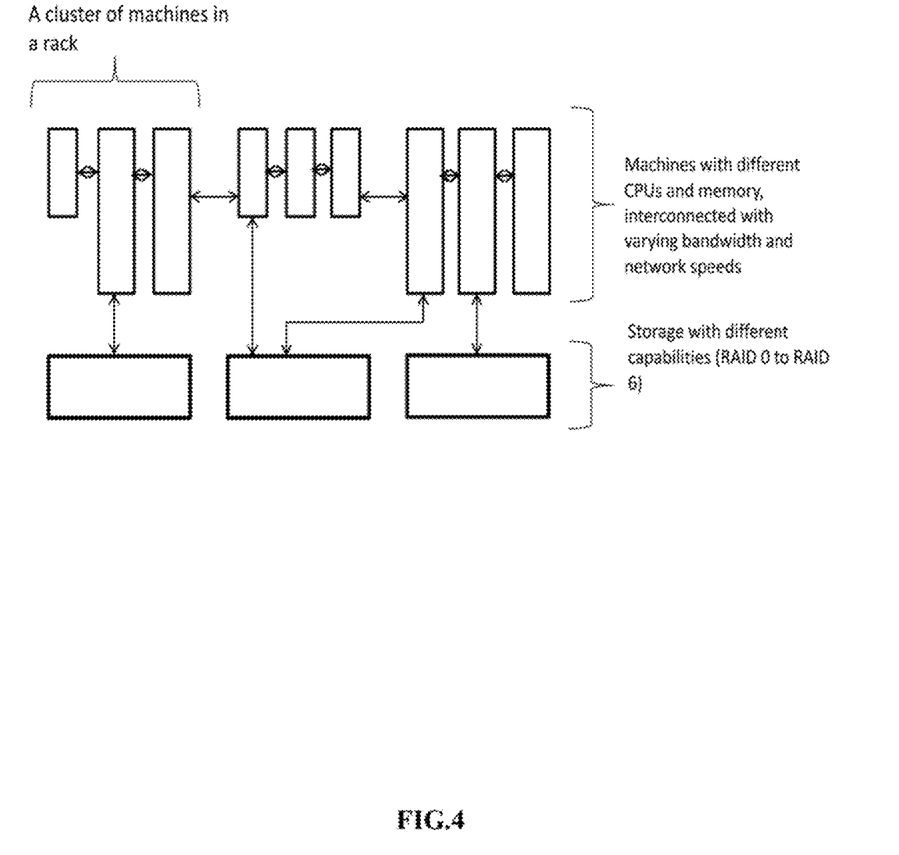
FIG. 4 illustrates one of the possible arrangements of the business artifacts, in accordance with the embodiments herein, according to one embodiment herein.

Further, depending on the network speed, business services that are closely integrated and will communicate frequently can be placed together within the same node and other services that are relatively disjoint can be spaced out (across nodes or racks). One of the many possible arrangements of the business services is illustrated in FIG. 4.

Further, the optimizer 16 should ensure that the node clustering mechanism is be rack-aware (i.e.) it should be aware of which physical nodes exist in which rack. To ensure reliability, if business services need to be duplicated, the optimizer 16 would ensure that such duplicated services are placed in nodes that are in different racks. Otherwise, a rack failure will crash all the nodes in the same rack and create reliability issues.

In accordance with the embodiments herein, the system 100 further includes a computer accessible knowledge base 18 cooperating with the optimizer 16. The knowledge base 18 is configured to store at least the information corresponding to the performance of the computer accessible objects. Further, the knowledge base 18 will track performance and reliability metrics of each of the generated business solutions post installation. The knowledge base incorporates the intelligence to recommend modifications to the deployment environment (for instance, add more CPU to a particular machine in the deployment environment, change the storage from RAID 0 to RAID 2) to enhance the performance and reliability.

In accordance with the embodiments herein, the services of the enterprise application are composed only once. These service compositions are subsequently compiled to produce the enterprise application to be deployed. During this compilation process, if the details of the deployment model are known, the compilation process can be optimized to produce the business application that executes with maximal performance for the deployment model. The enterprise application will be recompiled automatically, by the system 100, if there are any changes to the underlying deployment model, and the enterprise application would be optimized for the new deployment model.

Figure 2:
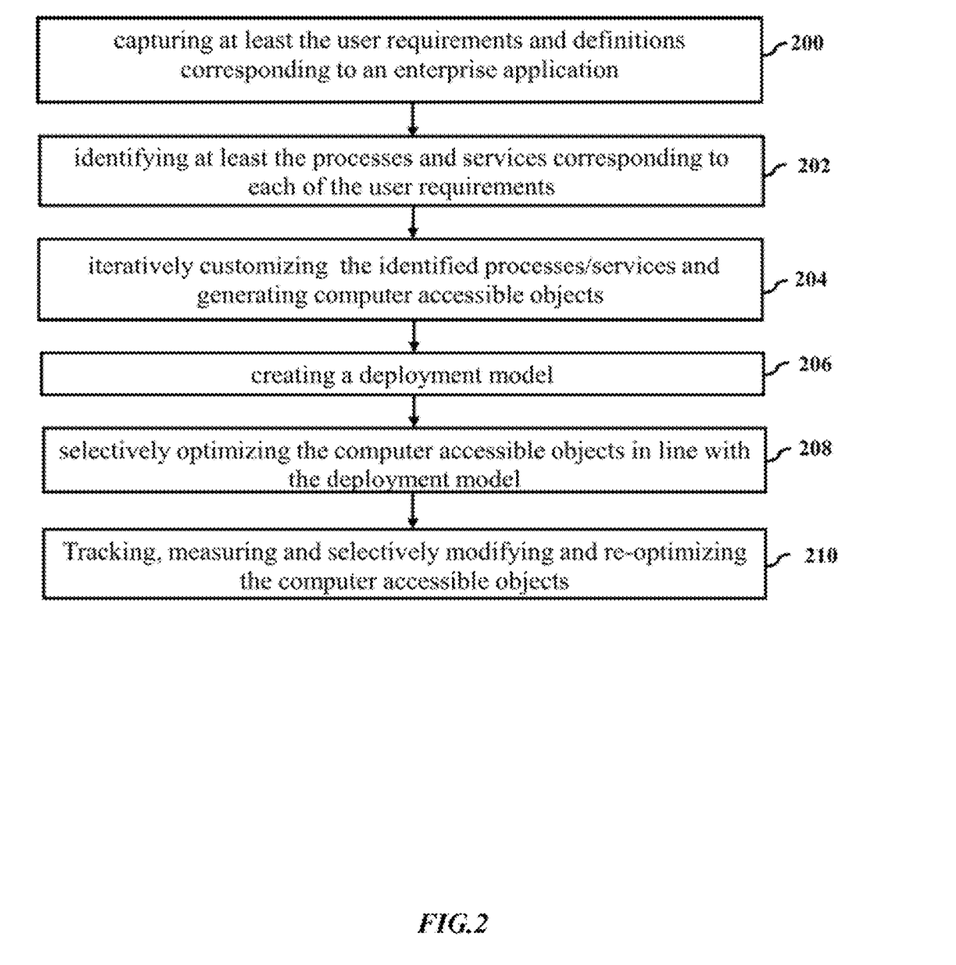
FIG. 2 illustrates a flowchart comprising the steps involved in the method for dynamically optimizing the business processes, according to one embodiment herein.

The embodiments herein, in accordance with a second embodiment discloses a computer implemented method for dynamically optimizing enterprise applications. The method, as illustrated through a flowchart in FIG. 2 comprises the following computer implemented steps: capturing at least the user requirements including non functional requirements, and definitions corresponding to an enterprise application to be deployed 200; identifying at least the processes and services corresponding to each of the user requirements 202; iteratively customizing the identified processes/services in accordance with at least the user requirements and generating a plurality of customizable computer accessible objects, the objects in combination forming the application to be deployed 204; creating a deployment model, the deployment model being a representation of the computer infrastructure required for successful deployment of the application 206; selectively optimizing the computer accessible objects in line with the deployment model 208; and tracking and measuring the performance of the optimized computer accessible objects, and selectively modifying and re-optimizing the computer accessible objects based on the performance 210.

In accordance with the second embodiment, the step of capturing at least the user requirements further includes the step of organizing the captured user requirements in accordance with a predetermined hierarchy.

In accordance with the second embodiment, the step of iteratively customizing the identified processes/services further includes the step of dynamically customizing the generated computer accessible objects in line with the customization of the identified process/services.

In accordance with the second embodiment, the method further includes the step of selectively deploying the generated model in a computer enabled environment, in accordance with the metadata corresponding to the computer enabled environment.

In accordance with a third embodiment, the embodiments herein discloses a non transitory computer readable medium having computer readable instructions stored thereupon, the computer readable instructions, when executed by a processor, cause a computer enabled device to: capture at least the user requirements including non functional requirements, and definitions corresponding to an enterprise application to be deployed; identify at least the processes and services corresponding to each of the user requirements; iteratively customize the identified processes/services in accordance with at least the user requirements and generate a plurality of customizable computer accessible objects, the objects in combination forming the application to be deployed; create a deployment model, the deployment model being a representation of the computer infrastructure required for successful deployment of the application; selectively optimize the computer accessible objects in line with the deployment model; and track and measure the performance of the optimized computer accessible objects, and selectively modify and re-optimize the computer accessible objects based on the performance.

In accordance with the third embodiment of the embodiments herein, the computer readable instructions, when executed by a processor are further configured to cause a computer enabled device to: organize the captured user requirements in accordance with a predetermined hierarchy; dynamically customize the generated computer accessible objects in line with the customization of the identified process/services; and selectively deploy the generated model in a computer enabled environment, in accordance with the metadata corresponding to the computer enabled environment.

Figure 5:
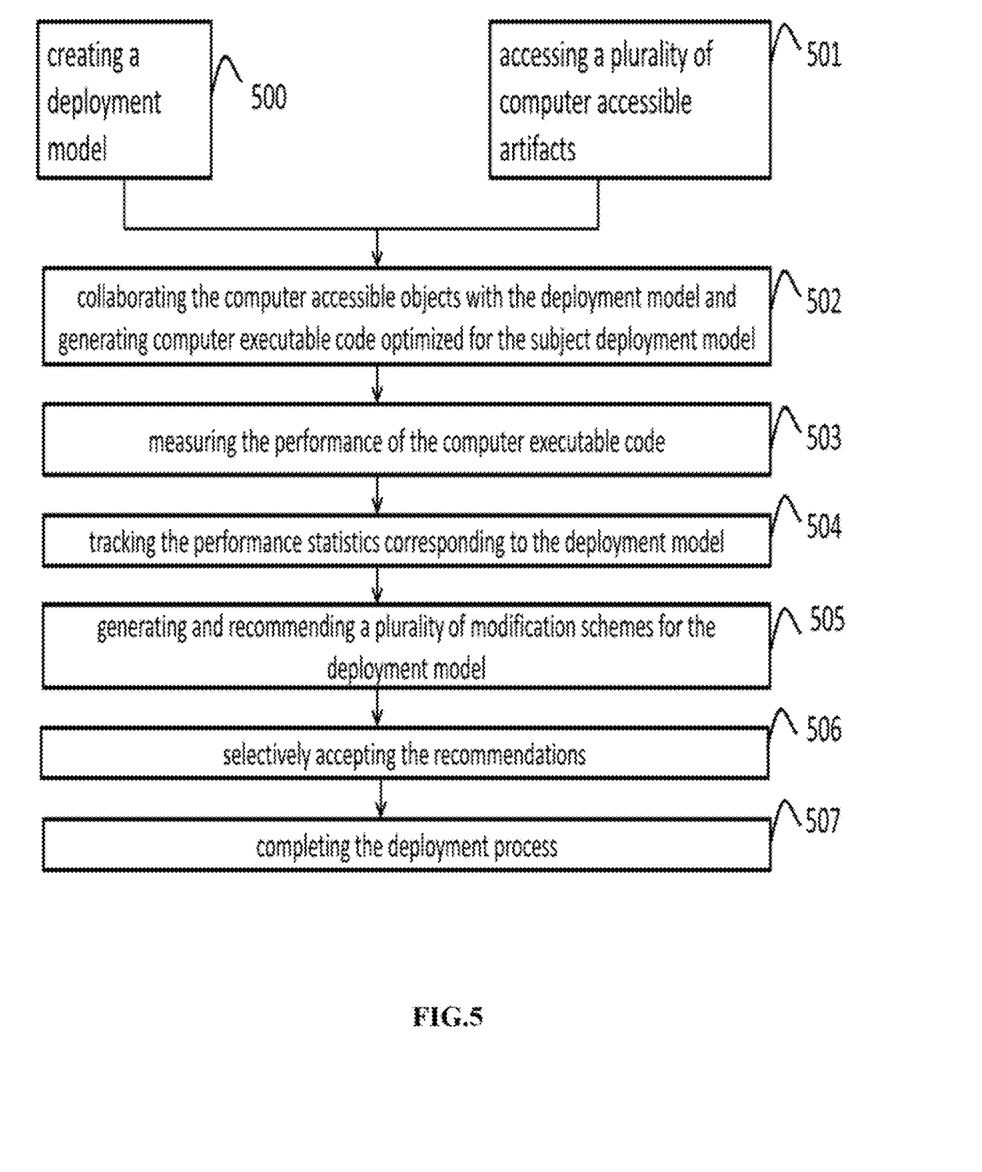
FIG. 5 is a flowchart illustrating the steps involved in the implementation of the computer implemented system for dynamically optimizing business applications, according to one embodiment herein.

Referring to FIG. 5, there is shown a flowchart illustrating the steps involved in the implementation of the computer implemented system for dynamically optimizing business applications. The flowchart includes the steps of creating a deployment model 500; accessing a plurality of computer accessible artifacts (business artifacts) 501; collaborating the computer accessible objects with the deployment model and generating computer executable code optimized for the subject deployment model 502; measuring the performance of the computer executable code 503; tracking the performance statistics corresponding to the deployment model 504; generating and recommending a plurality of modification schemes for the deployment model based on the performance statistics corresponding to the deployment model 505; selectively accepting the recommendations 506; and completing the deployment process 507.

The technical advantages of the embodiments herein envisage a system and method for dynamically optimizing a plurality of enterprise applications. The system and method envisaged by the embodiments herein provides for development, seamless integration and execution of enterprise applications. The system and method of the embodiments herein enable seamless integration of platform services and business rules. The system and method also enables creation of enterprise application from a functional point of view as well as a non-functional point of view. The system further makes use of Service Oriented Architecture (SOA) to develop enterprise applications. The system also optimizes the configuration of business services, in order to improve reliability and performance. The system and method envisaged by the embodiments herein also enables dynamic optimization of the enterprise applications, by providing for selective reconfiguration of the underlying business services. The system analyzes the (deployment) environment of the enterprise application, and suggests appropriate modifications to the deployment environment, in order to improve the performance and reliability of enterprise applications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

It is also to be understood that the following claims are intended to cover all of the generic and specific features of the embodiments described herein and all the statements of the scope of the embodiments which as a matter of language might be said to fall there between.

What is claimed is:

1. A computer implemented system for dynamically optimizing enterprise applications, said system comprising a processor communicably coupled to a memory module, said processor configured to:
    capture at least user requirements including non-functional requirements, and definitions corresponding to an enterprise application to be deployed;
    identify at least processes and services corresponding to each of captured user requirements;
    iteratively customize identified processes and services in accordance with at least captured user requirements, by modifying at least characteristics of said identified processes and services, and generate a plurality of customizable computer accessible objects by selectively encapsulating said identified processes and services, and thereby transforming said identified processes and services into said plurality of customizable computer accessible objects, said computer accessible objects in combination forming an enterprise application, said computer accessible objects further incorporating iterative customizations performed on said identified processes and services;
    create a deployment model, said deployment model representing at least computer infrastructure required for successful deployment of the enterprise application; and
    selectively optimize said computer accessible objects, in real-time, in line with the deployment model, by re-modifying at least said characteristics of said identified processes and services encapsulated within said computer accessible objects;
    monitor execution of said computer accessible objects post optimization, and determine a performance of said computer accessible objects, and selectively adjust at least said characteristics of said identified processes and services, thereby re-optimizing said computer accessible objects to improve said performance thereof.

2. The system as claimed in claim 1, wherein said system further comprises a computer accessible knowledge base cooperating with said processor, said knowledge base configured to store the information corresponding to the performance of the computer accessible objects.

3. The system as claimed in claim 1, wherein said processor is further configured to organize the captured user requirements in accordance with a predetermined hierarchy.

4. The system as claimed in claim 1, wherein said processor is further configured to dynamically customize the computer accessible objects in line with customization of the identified processes and services.

5. A computer implemented method for dynamically optimizing enterprise applications, said method comprising the following computer implemented steps:
    capturing at least the user requirements including non-functional requirements, and definitions corresponding to an enterprise application to be deployed;
    identifying at least processes and services corresponding to each of captured user requirements;
    iteratively customizing identified processes and services in accordance with at least captured user requirements, by modifying at least characteristics of said identified processes and services, and generating a plurality of customizable computer accessible objects by selectively encapsulating said identified processes and services, thereby transforming said identified processes and services into said plurality of customizable computer accessible objects, said computer accessible objects in combination forming an enterprise application, said computer accessible objects further incorporating, iterative customizations performed on said identified processes and services;

creating a deployment model, said deployment model representing at least computer infrastructure required for successful deployment of the enterprise application;

selectively optimizing said computer accessible objects, in real-time, in line with the deployment model, by re-modifying at least said characteristics of said identified processes and services encapsulated within said computer accessible objects;

monitoring execution of said computer accessible objects post optimization, and determine a performance of said computer accessible objects, and selectively adjusting at least said characteristics of said identified processes and services, thereby re-optimizing said computer accessible objects to improve said performance thereof.

6. The method as claimed in claim 5, wherein the step of monitoring execution of said computer accessible objects post optimization, further includes the following steps:
   recommending modifications to a deployment model based on said performance of said computer accessible objects; and
   re-optimizing said computer accessible objects based on a modified deployment model to complete optimized deployment of the enterprise application.

7. The method as claimed in claim 5, wherein the step of capturing at least the user requirements further includes the step of organizing the captured user requirements in accordance with a predetermined hierarchy.

8. The method as claimed in claim 5, wherein the step of iteratively customizing the identified processes and services further includes the step of dynamically customizing the computer accessible objects in line with customization of identified process and services.

9. The method as claimed in claim 5, wherein the method further includes the step of selectively deploying the deployment model in a computer enabled environment, in accordance with metadata corresponding to said computer enabled environment.

10. A non-transitory computer readable medium having computer readable instructions stored thereupon, the computer readable instructions when executed by a processor, configured to cause the processor to:
   capture at least user requirements including non-functional requirements, and definitions corresponding to an enterprise application to be deployed;
   identify at least processes and services corresponding to each of captured user requirements;
   iteratively customize identified processes and services in accordance with at least captured user requirements, by modifying at least characteristics of said identified processes and services, and generate a plurality of customizable computer accessible objects by selectively encapsulating said identified processes and services, and thereby transforming, said identified processes and services into said plurality of customizable computer accessible objects, said computer accessible objects in combination forming an enterprise application, said computer accessible objects further incorporating iterative customizations performed on said identified processes and services;
   create a deployment model, said deployment model representing at least computer infrastructure required for successful deployment of the enterprise application; and
   selectively optimize said computer accessible objects, in real-time, in line with the deployment model, by re-modifying at least said characteristics of said identified processes and services encapsulated within said computer accessible objects;
   monitor execution of said computer accessible objects post optimization, and determine a performance of said computer accessible objects, and selectively adjust at least said characteristics of said identified processes and services, thereby re-optimizing said computer accessible objects to improve said performance thereof.

11. The non-transitory computer readable medium as claimed in claim 10, wherein the computer readable instructions, when executed by the processor, further cause the processor to:
   recommend modifications to the deployment model based on said performance of said computer accessible objects; and
   re-optimize said computer accessible objects based on a modified deployment model to complete optimized deployment of the enterprise application.

12. The non-transitory computer readable medium as claimed in claim 10, wherein the computer readable instructions, when executed by the processor, further cause the processor to:
   organize the captured user requirements in accordance with a predetermined hierarchy;
   dynamically customize the computer accessible objects in line with customization of the identified process and services; and
   selectively deploy the deployment model in a computer enabled environment, in accordance with metadata corresponding to said computer enabled environment.

* * * * *